W. E. BLEECKER.
Rotary Plows.
No. 154,168.
2 Sheets--Sheet 1.
Patented Aug. 18, 1874.
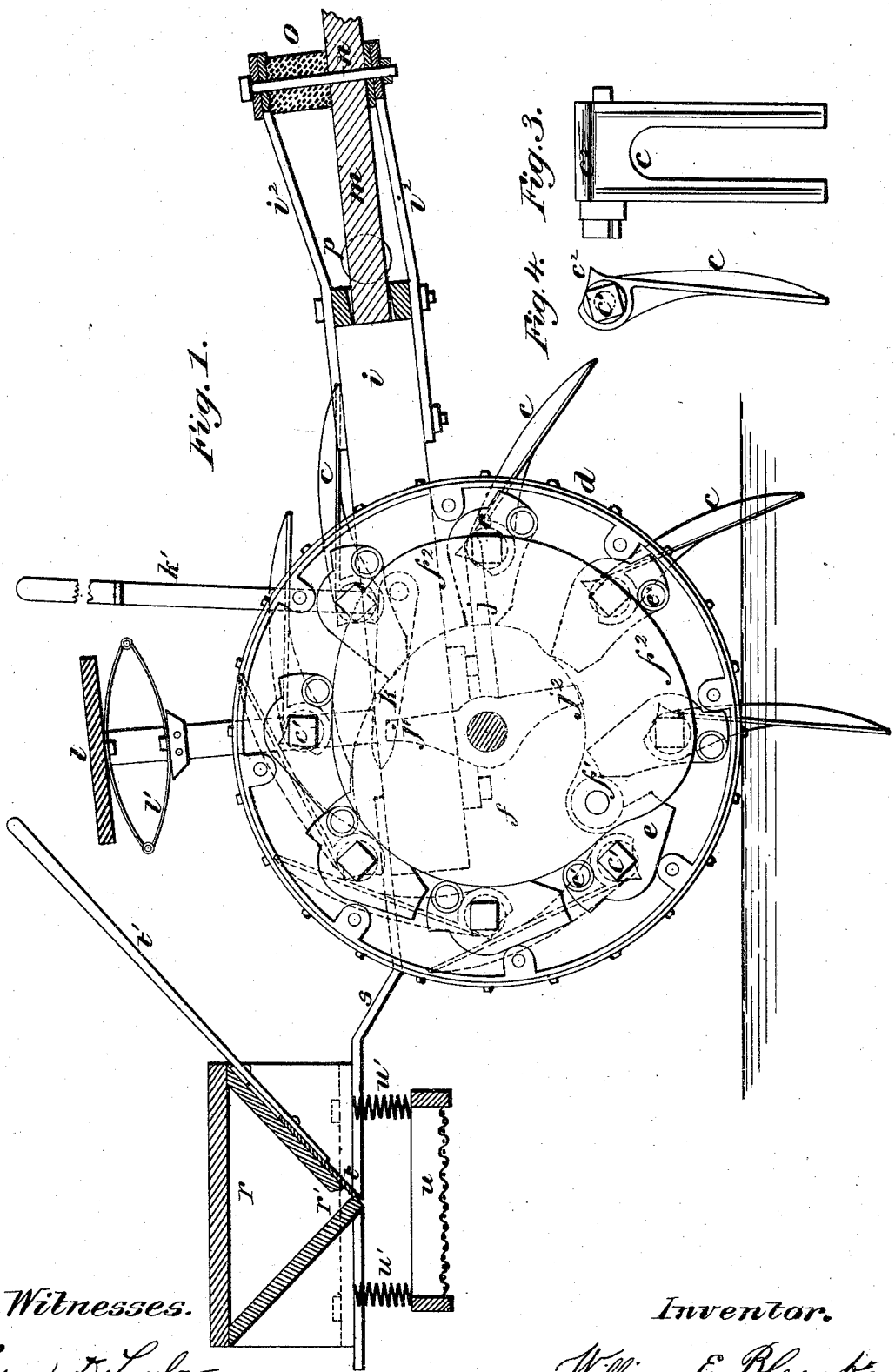
Witnesses.
Esau D. Taylor.
Alfred Shedlock.
Inventor.
William E. Bleecker.

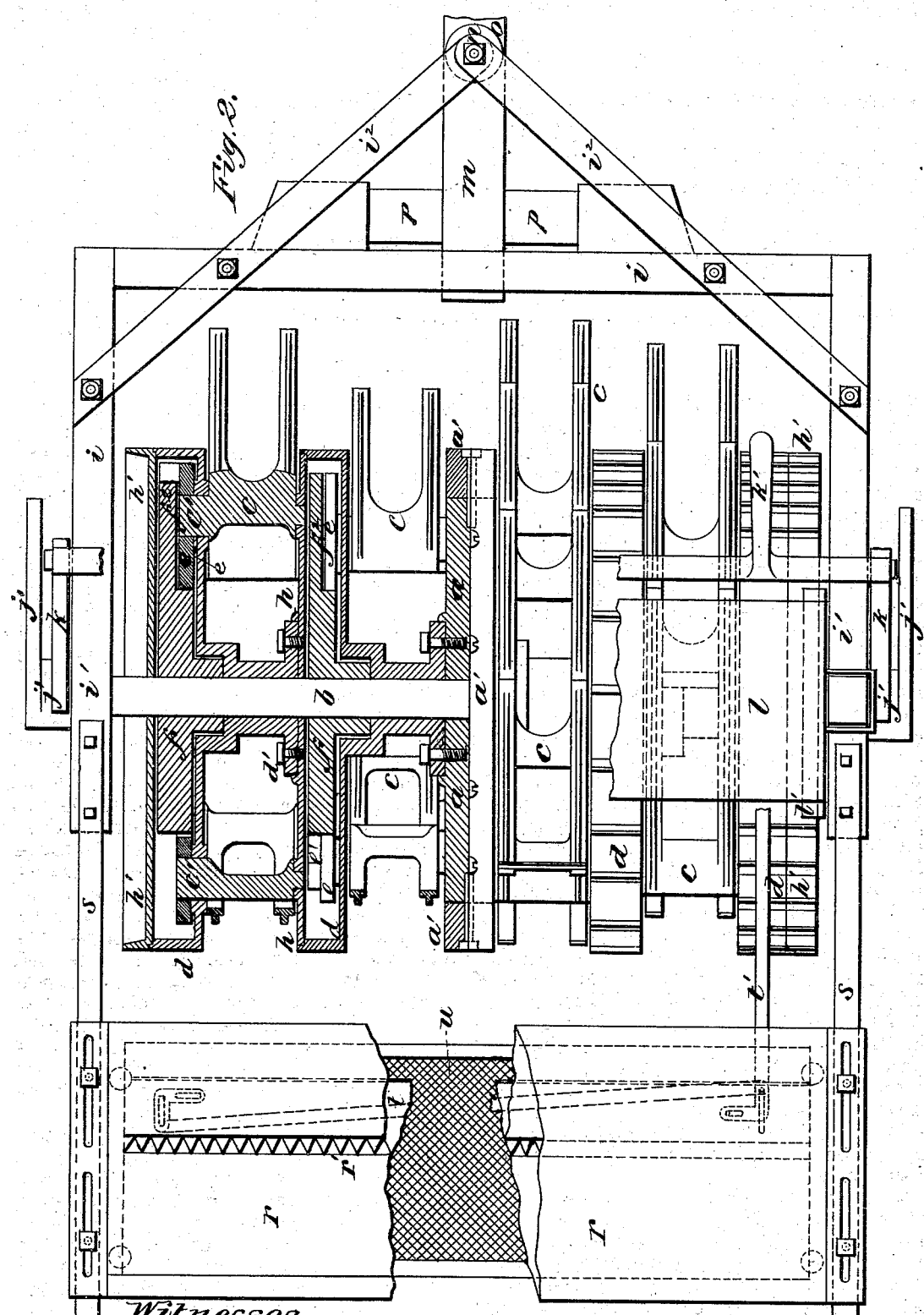

UNITED STATES PATENT OFFICE.

WILLIAM E. BLEECKER, OF BROOKLYN, ASSIGNOR OF PART HIS INTEREST TO HENRY BLEECKER, TRUSTEE, OF NEW YORK CITY, GEORGE M. BLEECKER, OF COEYMANS, AND EDWARD BLEECKER, TRUSTEE, OF WHITESTONE, NEW YORK.

IMPROVEMENT IN ROTARY PLOWS.

Specification forming part of Letters Patent No. 154,168, dated August 18, 1874; application filed April 11, 1873.

*To all whom it may concern:*

Be it known that I, WILLIAM E. BLEECKER, of Brooklyn, in the county of Kings and State of New York, have invented Improvements in Rotary Plows, of which the following is a specification:

My invention consists in placing all the wheels on one axle, and the cams which operate the plowing-forks being secured by means of keys to the axle, so that by turning the axle partly round the forks are thrown out from the upper sides of the wheels, leaving the under side of the wheels with the forks closed, enabling the machine to be turned and transported on the plowing-wheels, thereby doing away with the outside traveling-wheels and levers for operating the same, as used in my rotary plow, patented July 16, 1872. Also, in pivoting the two inside series of plowing-forks to a center disk, being of a smaller diameter than the wheels, thereby enabling the machine to adapt itself to inequalities of the ground when hard; and attaching to the disk segments in such a manner as to make the periphery the same diameter as the plowing-wheels, so as to give the machine more bearing-surface when the ground is soft, and in arranging the wheels in relation to one another so that no two forks shall be raising the earth at one time. Also, in attaching springs to the frame, between which the end of the tongue lies, so that any lateral motion, imparted to the tongue by uneven movements of the horses or other causes, shall not cause any excessive strain on the forks which are in the ground.

An adjustable attachment connects the seed-sower with the machine at variable distances from it, so that the distributed seed can be covered up by a greater or less depth of the soil which is thrown up by the plowing-forks. The seed-sowing is accomplished, as will be obvious, by the first transit of the rotary plowing-machine over the ground.

But to describe my invention more particularly, I will refer to the accompanying drawings forming part of this specification, in which—

Figure 1 is a side elevation of a plowing-wheel with the cover removed; also showing the frame and seed-sower in section. Fig. 2 is a plan of my improved plowing-machine, with half the wheels and seed-sower in section, showing their construction. Fig. 3 is a detached front view of one of the two-bladed forks; and Fig. 4 is a side view of the same.

As all parts of the machine are alike on both sides of the center disk, excepting they are made right and left, it will only be necessary to describe one-half.

In constructing the machine the center-piece or disk $a$ is first put on the axle $b$. The small journals of the forks $c\ c$ are placed in holes in the disk $a$. The wheel $d$ is then put on the axle, the other journals of the forks $c\ c$, with the squares $c'\ c'$, are passed through holes in the side of the wheel, and the flange $d'$ of the wheel $d$ is secured to the center disk $a$ by screw-bolts. The cams or tappets $e\ e$ are then put on the squares $c'\ c'$ of the forks $c\ c$, and secured thereto by means of screws. The large cam $f$ is then placed in the wheel and secured to the shaft by a key, and the tappets $e\ e$ come in contact with the roller $f^1$, when the forks $cc$ have just passed the vertical position in the ground, throwing them suddenly into a horizontal position, thereby breaking up the soil, and then closing the forks up within the periphery of the wheel. The part of the cam $f^2$ operates the pins or rollers $e'\ e'$ on the tappets $e\ e$, moving the forks out from within the periphery of the wheel into such position that the parts of the blades shall enter the ground so that the holes made by them shall be of the least possible size, thereby requiring the minimum of power to drive them into the ground. The cover $h$ is then placed on the wheel $d$ and secured thereto by screws. It is also provided with holes similar to the disk $a$, into which is placed the small journals of another set of forks, $cc$. Another wheel, $d$, is then placed on the shaft and fastened to the cover $h$ by screw-bolts. The small cams or tappets $e\ e$ and large cam $f$ are then placed within the wheel, as before described, and a cover, $h'$, provided with a flange of the same diameter as the wheels $d\ d$, is then secured to the wheel, thereby covering up all the mechanism by which the forks $c\ c$ are operated. The axle $b$ has bearings on the frame $i$, at $i^1\ i^1$, and onto the ends of the axle, projecting beyond the frame, are firmly keyed the levers $j\ j$, said levers having each two projections, $j^1$ and $j^2$, which fit into and are held by the catches $k\ k$ pivoted at the sides of the frame $i$. When the projections $j^1\ j^1$ of the levers $j\ j$ are held by the catches $k\ k$, then the cam, secured to the shaft or axle $b$, is in position to throw the forks out of and into the ground. When it is required to turn the machine round, or transport it, all that it is necessary to do is for the driver to raise the catches $k\ k$, by means of the handle $k'$, and then by backing the horses the axle turns with the wheels and draws the forks out of the ground, and the projections $j^2\ j^2$ are held by the catches $k$, leaving the under side of the wheels with the forks closed within the periphery. Raising the catches $k\ k$, when the machine is going forward, will bring the cams into digging position. The axle also may be turned by the levers $j\ j$. $l$ represents the driver's seat, supported on the springs $l'\ l'$. The pole or tongue $m$ is secured to the frame $i$ by the bolt $n$ passing loosely through it and through the braces $i^2\ i^2$. On the upper side of the tongue, and embracing the bolt $n$, is a spring, $o$, the object of which is to obviate any severe strains to which the forks may be put in encountering any obstacle in the ground, as in such a case the spring would compress and the axle, with the cams, turn round, so as not to operate the forks until the obstacle is passed. The lateral motion of the tongue, caused by the uneven movements of the horses or other causes, is prevented from imparting any excessive strain to the forks in the ground by the springs $p\ p$, attached to the frame and pressing against the sides of the tongue. The bolt $n$, in such a case, would act as the fulcrum upon which the pole moves. The disk $a$ is enlarged to the size of the plowing-wheels by the tire $a'$, which is put on in sections and secured by screws or other suitable means, so that more bearing-surface is provided to sustain the machine on the surface of the ground when the soil is soft. The seed-box $r$ extends the whole width of the machine, and is supported by the bars $s\ s$ fastened to the frame $i$. It is provided with an opening, $r'$, in the bottom, which is covered with the slide $t$, the lower end of the slide being serrated, so that the quantity of seed allowed to fall from the box may be perfectly controlled. The slide is opened and shut by the handle or lever $t'$, which operates bell-crank levers attached to the box and to the slide, the said handle, $t'$ extending upward so as to be within the reach of the driver. The seed, in leaving the box $r$, falls upon the sieve $u$, which is fastened to the box by means of the springs $u'\ u'$, so that it vibrates readily when the machine is working and scatters the seed over the whole of the ground dug or plowed up by the forks. The box $r$ is fastened to the bars $s\ s$ by screws or bolts passing through slots in flanges on either end, and is adjustable to or from the rear of the machine, so that the seed is covered by the requisite quantity of earth as it falls on the ground.

The teeth, as shown in the drawings, are of iron. Steel teeth, being thinner, will not, when shut up within the peripheries of the wheels, be quite so near each other.

I claim—

1. The wheels $d\ d$ carrying the plowing-forks $c\ c$, in combination with levers $j\ j$ and catches $k\ k$, the whole constructed and operating substantially as hereinbefore set forth.

2. The wheels $d\ d$, arranged as described, in combination with the center disk $a$, as and for the purposes described.

3. The springs $p\ p$ in combination with the frame $i$, tongue $m$, and wheels $d\ d$, carrying plowing-forks $c\ c$, substantially as hereinbefore set forth.

WILLIAM E. BLEECKER.

Witnesses:
JOHN H. TILLMAN,
RO. H. GALLAHER.